United States Patent
Chopra et al.

(10) Patent No.: US 10,146,637 B1
(45) Date of Patent: Dec. 4, 2018

(54) INTELLIGENT SNAPSHOT ROLLBACKS

(71) Applicant: EMC IP Holding Company LLC, Hopkinton, MA (US)

(72) Inventors: Shelesh Chopra, Bangalore (IN); Sadagopan Balaraman, Franklin, MA (US); Eric Matthies, Millis, MA (US); Phillip Hamer, Medway, MA (US); Munira Manasawala, Herndon, VA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/650,811

(22) Filed: Jul. 14, 2017

(51) Int. Cl.
*G06F 12/00* (2006.01)
*G06F 11/14* (2006.01)

(52) U.S. Cl.
CPC ...... *G06F 11/1464* (2013.01); *G06F 11/1451* (2013.01)

(58) Field of Classification Search
CPC ............. G06F 11/1448; G06F 11/1471; G06F 2201/80; G06F 2201/815; G06F 2201/82
See application file for complete search history.

(56) References Cited

U.S. PATENT DOCUMENTS

2015/0019495 A1\* 1/2015 Siden .................. G06F 11/1448
707/649

\* cited by examiner

*Primary Examiner* — Yong J Choe
(74) *Attorney, Agent, or Firm* — Staniford Tomita LLP (57) ABSTRACT

A set of snapshots are stored for a first object. The first object uses a first logical unit number (LUN) to store data. The snapshots correspond to points-in-time that the first object may be rolled back to. A request is received for a directed rollback of the first object to a second object. The request specifies a particular snapshot of the set of snapshots. The second object uses a second LUN, different from the first LUN to store data. After receipt of the request, a discovery map of the second object is dynamically created. The discovery map specifies a storage stack associated with the second object that maps the second object to a physical storage device accessed through the second LUN. The directed rollback to a point-in-time corresponding to the particular snapshot is performed by obtaining, from the discovery map, the storage stack associated with the second object.

18 Claims, 7 Drawing Sheets

INTELLIGENT SNAPSHOT ROLLBACKS

TECHNICAL FIELD

The present invention relates generally to the field of data management, and, more particularly, to restoring data.

BACKGROUND

Backups allow enterprises to recover their production systems should the need arise. Traditional backups cannot meet the requirements for scalability, shortened recovery times, and efficiency because of the enormous amounts of data being generated and processed every day. Snapshots, however, have emerged as a key technology to help drive down backup costs and improve efficiency.

Snapshots can be created very quickly because they store virtual copies of the data rather than actual copies of the data itself. In other words, the snapshots may define where and how the data is stored and organized. Traditional approaches, however, do not provide for restoring a backup snapshot of an object to a different object. Such a system would be desirable because it would allow, for example, restoring a snapshot of a production volume to a different target volume that may be used for quality assurance (QA) testing and reporting, data analytics, and so forth without having to tamper with the production volume.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain, Data Domain Replicator, and Data Domain Boost are trademarks of Dell EMC Corporation.

BRIEF DESCRIPTION OF THE FIGURES

In the following drawings like reference numerals designate like structural elements. Although the figures depict various examples, the one or more embodiments and implementations described herein are not limited to the examples depicted in the figures.

DETAILED DESCRIPTION

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. A "non-transitory storage medium" or "non-transitory computer-readable storage medium" may include any media that can contain, store, or maintain programs, information, and data. Examples include physical media such as, for example, electronic, magnetic, optical, electromagnetic, or semiconductor media. More specific examples of non-transitory storage medium or non-transitory computer-readable storage medium include a magnetic computer diskette such as floppy diskettes or hard drives, magnetic tape, a random access memory (RAM), a read-only memory (ROM), an erasable programmable read-only memory (EPROM), a flash drive, a compact disc (CD), or a digital video disk (DVD).

Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Disclosed herein are methods and systems for performing data recovery operations. Some embodiments of the invention involve snapshot rollback operations associated with a backup and recovery application in a distributed system, such as a very large-scale wide area network (WAN), metropolitan area network (MAN), or cloud based network system, however, those skilled in the art will appreciate that embodiments are not limited thereto, and may include smaller-scale networks, such as LANs (local area networks), and other applications. Thus, aspects of the one or more embodiments described herein may be implemented on one or more computers executing software instructions, and the computers may be networked in a client-server arrangement or similar distributed computer network.

Figure 1:
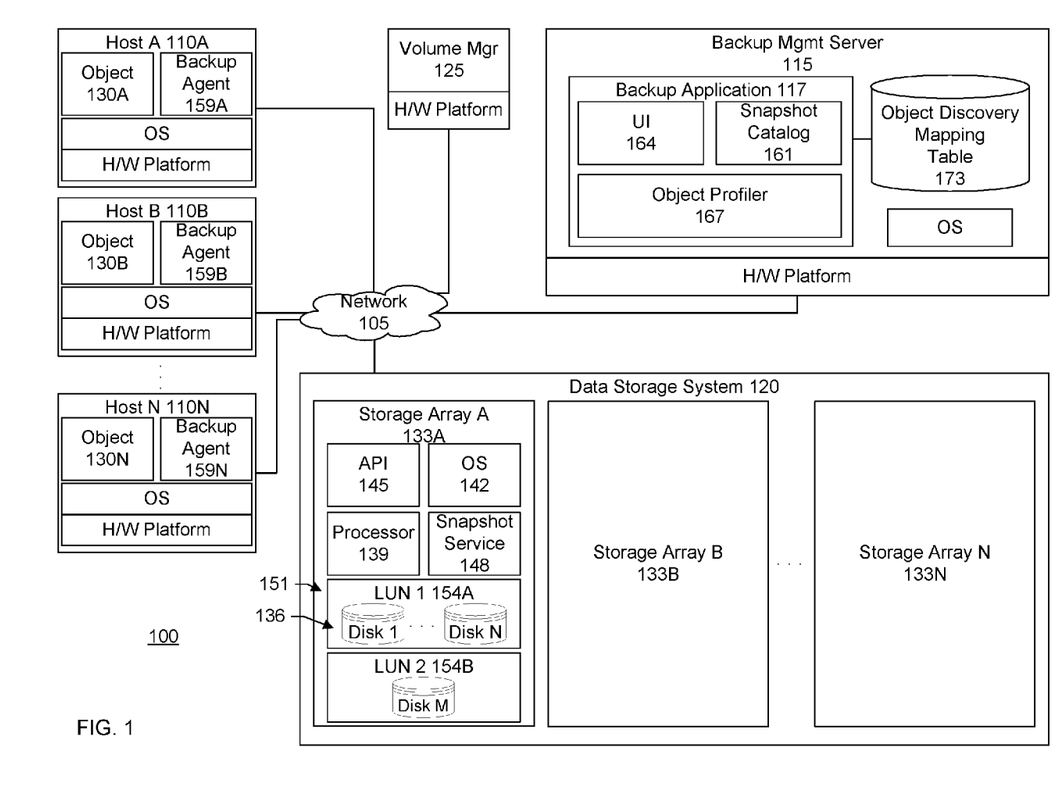
FIG. 1 is a diagram of a large-scale network implementing a system for intelligent snapshot rollbacks, under some embodiments.

FIG. 1 illustrates a computer network system 100 that implements one or more embodiments of a system for intelligent snapshot rollbacks. In system 100, any number of computing nodes are coupled directly or indirectly through a network 105. There can be any number of application hosts 110A-N, a backup management server 115 with a backup and recovery application 117, a data storage system 120, and a volume manager 125, each of which are coupled directly or indirectly to each other through network 105. The network may be a cloud network, local area network (LAN), wide area network (WAN) or other appropriate network. Network 105 provides connectivity to the various systems, components, and resources of system 100, and may be implemented using protocols such as Transmission Control Protocol (TCP) and/or Internet Protocol (IP), well known in the relevant arts.

In a specific embodiment, the system allows backup snapshots associated with an object to be rolled back to a different object. These two objects may be associated with different hosts, (logical) volumes, volume groups, and storage arrays. In an embodiment, there is a snapshot of a LUN in which the snapshot is rolled back to a different LUN. In other words, the LUN snapshot may be rolled back to a LUN that is different from the LUN from which the snapshot was taken.

The host computers host objects. The objects may be referred to as logical objects or executable objects. For example, first host 110A may host a first object A 130A, second host 110B may host a second object B 130B, and so forth. Examples of objects include file systems, databases, and other applications or programs. These objects may use, access, manage, generate, process, or manipulate data stored on the data storage system.

The data storage system may include any number of storage arrays 133A-N. A storage array, such as a first storage array 133A, stores data accessed or used by an application host. The storage array may include arrays of disks 136, storage controller or processor 139, device operating system 142, application programming interface (API) 145, and a snapshot service 148. The disks may be organized into logical unit numbers (LUNs) 151.

In the example shown in FIG. 1, a first LUN 154A of first storage array 133A includes disks 1-N. A second LUN 154B of the first storage array includes a disk M. A storage array may include any number of disks organized into any number of LUNs. A LUN is a number or other identifier used to identify a logical storage unit. A disk may be configured as a single LUN (e.g., LUN 154B). A LUN may include multiple (e.g., two or more) disks such as LUN 154A. A LUN may include a portion of a disk, portions of multiple disks, or multiple complete disks. A LUN can be presented or mounted to an application host so that it appears to the host OS as a physically attached local disk and assigned a drive letter.

The volume manager provides a further abstraction of the physical storage. The volume manager facilitates administration and configuration of the data storage system for the hosts including, for example, organizing the LUNs by providing an additional virtualization layer. Organizing the LUNs may include dividing the LUNs into smaller logical or virtual volumes, grouping one or more (logical) volumes into volume groups, and providing other storage configuration and management services (e.g., dynamically resizing volumes, or policy enforcement).

The interface or API allows the storage array to exchange communications with the other components in the system such as the backup application, application hosts, and volume manager. The communications may include receiving and responding to commands or calls from the backup application. The snapshot service associated with a storage array creates snapshots of the array. These snapshots may then be indexed in a catalog 161 as a save set. The catalog is maintained by the backup application. A user (e.g., administrator) may browse the catalog and select a snapshot save set to recover. The recovery may include a roll back in which the original data is overwritten. The recovery may include mounting a snapshot save set to browse and select individual items (e.g., directories or files) to recover or recover the entire save set.

The backup application may include backup agents 159A-N deployed to the host computers. In a specific embodiment, the backup application directs and coordinates the operations of the agents and data storage system to protect the data in the data storage system through the use of snapshots. Snapshots are instantaneous copy images of volume data, capturing the data exactly as it appeared at the specific point-in-time when the snapshot was created. Snapshots enable users to save the volume data state, and then access the specific volume data at a later time, whenever needed, including after the source volume has changed. Snapshots can be created very quickly and facilitate data protection techniques such as CDP (Continuous Data Protection), SIDP (Storage Integrated Data Protection), and others.

Snapshots can be used by the backup application to help enable recoveries of data and applications to earlier points-in-time. A snapshot can define the backup content by including a set of reference markers or pointers to data stored on a storage device (e.g., disk drive, disk array, storage array, or storage area network (SAN)). A snapshot can provide a state of the system or a virtual copy of data at a particular point-in-time, e.g., time the snapshot was taken. In an embodiment, the backup snapshots are array-based snapshots that are created at the block-level. A block-level copy can provide faster performance and greater flexibility than a file-level copy. For example, a block-level copy may be used to copy only the blocks of a file that have changed rather than the entire file.

One or more snapshots may remain on the storage array so that quick restores can be provided if needed. For example, snapshots may be taken periodically of a production object (e.g., file system, "/FS1"). During the backup snapshotting process, the object (e.g., "/FS1") may be referred to as a source. In the case of a failure, a rollback operation can be performed on "/FS1" using a backup snapshot of "/FS1." During the rollback operation, "/FS1" may be referred to as a target to be re-synchronized block-by-block with the selected backup snapshot of "/FS1." That is, the rollback may be to the same object that was backed up.

The system may be configured to retain recent snapshots on primary storage. The backup application may further rollover or backup from a snapshot on the storage array to separate backup media (e.g., tape or disk). Once the rollover is complete, the snapshot may or may not be deleted. Deleting the snapshot frees up space on primary storage. Maintaining the snapshot on primary storage, however, allows for quick restores as data does not have to be copied over from the backup media.

Figure 2:
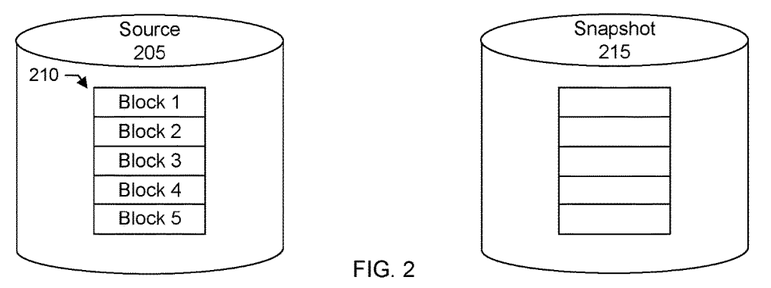
FIG. 2 shows an example of a snapshot operation in a first state.
Figure 3:
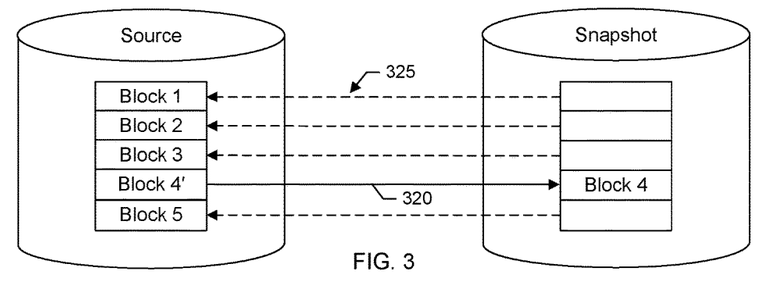
FIG. 3 shows an example of the snapshot operation in a second state, after the first state.

FIGS. 2 and 3 show an example of a snapshot operation. FIG. 2 shows a data source 205 (e.g., source volume) which includes a set of blocks 210 in which data may be stored. In a snapshot backup, a region on storage may be set aside for a snapshot 215.

Referring now to FIG. 3, when a block on the source is changed, the original data in the block may be copied to the snapshot. For example, in FIG. 3, a fourth block in the source has been changed as indicated by "block 4'" and the original data in the block has been written 320 to the snapshot as indicated by "block 4." The snapshot can be accessed to provide a view of the system at the time the snapshot was taken. Specifically, in this example, the snapshot may store the original data from the fourth block and include pointers 325 to the unchanged blocks (e.g., first, second, third, and fifth data blocks) on the source. There are many different types of snapshot methods such as copy-on-write (COW), redirect-on-write, clone or split mirror, incremental snapshots, continuous data protection (CDP) type snapshots, and others.

Figure 4:
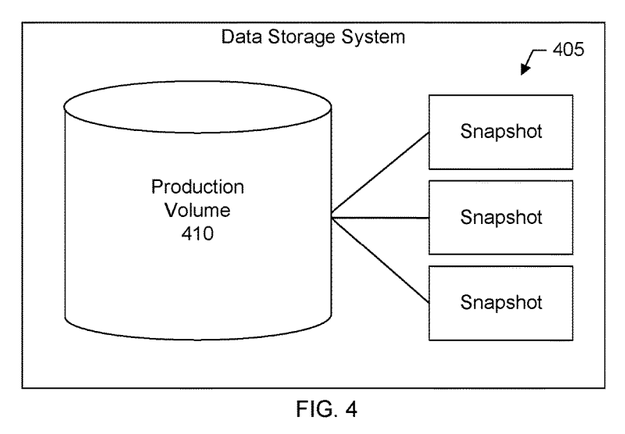
FIG. 4 shows a block diagram of snapshots created for a production volume in a data storage system.

In a specific embodiment, systems and techniques are provided to allow a snapshot backup of a LUN to be rolled back to a different LUN. This type of restoration may be referred to as a directed, redirected, or out-of-place restore. Being able to rollback from a snapshot to a LUN different from which the snapshot was taken has many benefits. For example, FIG. 4 shows a block diagram of a production volume 410 that may be provisioned within the data storage system and accessed by a host. A set of snapshots 405 have been taken of the production volume at various times. For example, snapshotting may occur hourly, daily, or at any other frequency or time interval, or on-demand. The snapshots allow the production LUN to be rolled back to earlier points-in-time corresponding to when the snapshots were taken. In an embodiment, a snapshot of the LUN (e.g., production LUN) can be rolled back to a different LUN. This can be beneficial for cases where the production LUN is no longer available, has become corrupted, or the array has been moved.

As another example, a directed restore may be used to facilitate quality assurance (QA) testing, or for data analytics and data mining. For example, snapshots may be taken of a production system on a daily basis. There can be a separate QA system for reporting. In an embodiment, the QA system can be refreshed very quickly from the backup snapshots of the production system as data may not have to be retrieved from a secondary storage system (e.g., tape). In a specific embodiment, a directed restore operation may be scheduled to run automatically on a periodic basis. For example, the directed restore operation may run nightly so that when a particular group arrives in the morning for work, not only has the production system been backed up, but a snapshot backup of the production system has also been restored to a different set of LUNs for QA or other purpose.

As another example, a directed restore may be used to facilitate validation. For example, a backup of a source file system may be rolled back to a different LUN. The target file system associated with the different LUN may then be mounted and validated. In the case of a database, the target database may be started on another host to validate the records and queries. The validation can be performed without impacting the production system. Problems that are discovered during the validation can be corrected on the QA system, verified, and then corrected on the production system.

Snapshot and replication operations of application data are key strategies to meet very demanding Service Level Objectives (SLOs) such as Recovery Point Objectives (RPOs) and Recovery Time Objectives (RTOs). They have changed the way the backup is perceived and led to a paradigm shift in the domain of backups. Snapshots can reduce the backup windows drastically to achieve the very aggressive SLAs that today's businesses demand. There is much advancement around bridging the gaps between the intelligence of storage arrays and providing the same level of transparency or intelligence in the backup software. There exists gaps in the way of rollback operations as rollbacks can often be very tedious and manual.

In an embodiment, a rollback is the process of restoring the image from snapshots back to production volume. An example of a rollback mechanism is NetWorker Snapshot Management (NSM) as provided by Dell EMC of Hopkinton, Mass. NSM uses the native capabilities of the storage array to perform rollbacks. A rollback is a restore in which a volume on the application host is unmounted and the storage array replaces the entire contents of the unmounted volume with the entire contents of an unmounted snapshot volume.

Figure 5:
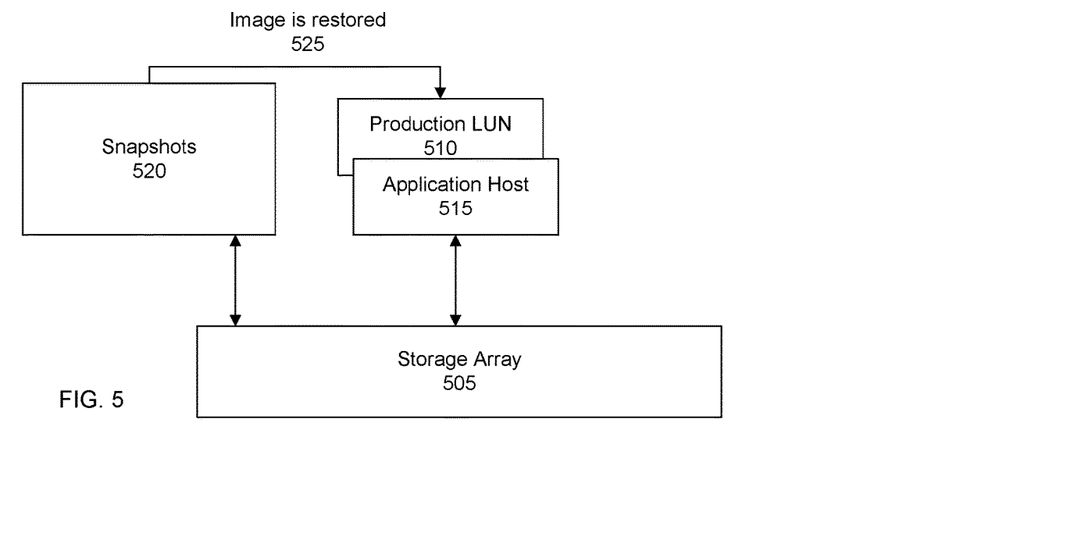
FIG. 5 shows a block diagram of rolling back a production LUN to a snapshot of the production LUN, under some embodiments.

FIG. 5 shows a block diagram of a rollback operation according to a specific embodiment. As shown in the example of FIG. 5, there is a storage array 505 in which a production LUN 510 has been provisioned and presented to an application host 515. Snapshots 520 have been created of the production LUN at various time intervals. During a rollback operation, blocks are copied 525 from the snapshot image (snapshot LUN) to the production host (source LUN). Specifically, the application makes a request to the restore the image to backup software. In a specific embodiment, the backup software accesses and understands the mapping of the snapshot LUN to production LUN and initiates requests to the storage arrays using an API provided by the arrays. This allows for restoring or recovering the production LUN to the point-in-time copy that is desired. This type of rollback may be referred to as an in-place rollback, i.e., restore the image to the same production LUN which was the one used to take backups.

Figure 6:
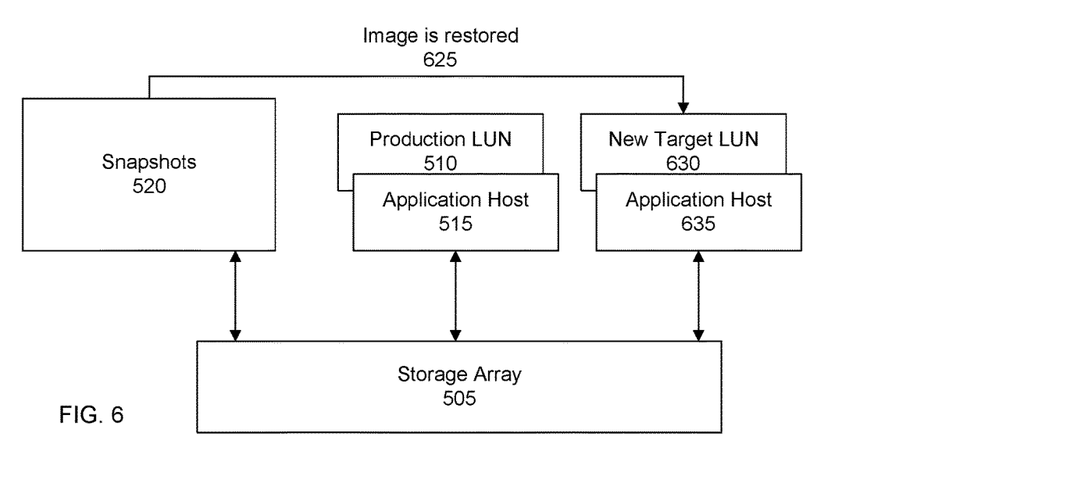
FIG. 6 shows a block diagram of rolling back to a different target LUN using a snapshot of the production LUN, under some embodiments.

FIG. 6 shows a block diagram of a rollback operation according to another specific embodiment. In this specific embodiment, the rollback may be referred to as a directed, redirected, or out-of-place restore. FIG. 6 is similar to FIG. 5. In FIG. 6, however, snapshots of the production LUN are rolled back 625 to a different target LUN 630 that may be mounted, used, or accessed by a different application host 635. This type of rollback operation may be performed where, for example, the production LUN is no longer available. In a specific embodiment, systems and techniques are provided for obtaining or capturing the mapping of a new target object including a new target LUN. During a directed rollback operation, the mapping may not be available for the new target LUN as the original backup that was performed may have involved a different object and different LUN such as a production LUN. The production LUN may mounted on a different host such as a production host.

Referring back now to FIG. 1, in a specific embodiment, the backup application includes several modules including a user interface 164, object profiler 167, and object discovery mapping table 173. It should be appreciated that FIG. 1 is merely illustrative of an embodiment. The blocks can be functional rather than structural so that it is possible to have many different hardware configurations, software configurations, or both that can perform the illustrated functions. Implementation of the functional entities may vary.

The user interface provides a central location and interface (e.g., graphical user interface or command line interface) through which a user (e.g., administrator) can interact with the system. Using the interface, the user can provide input to the backup application and view output from the application. For example, the user may request, through the interface, a directed rollback operation, select the particular backup snapshot to restore, select the target object that should be rolled back to the point-in-time corresponding to the selected backup snapshot, access the discovery map, view the mapping information, and perform other configuration and management from a central location.

Figure 7:
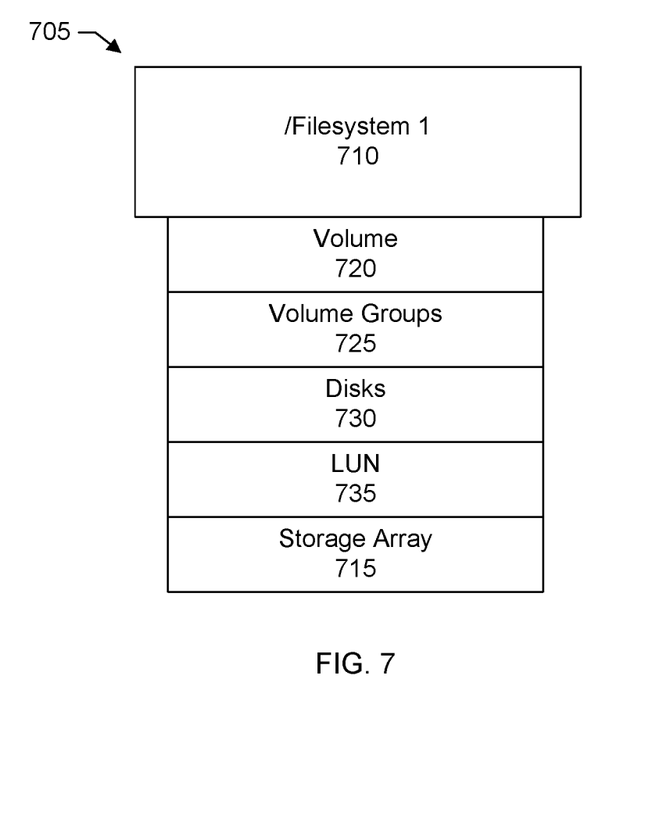
FIG. 7 shows a block diagram of a storage stack, under some embodiments.

The profiler is responsible for conducting discovery operations of an object such as a file system or application to obtain a mapping of the object to the storage array. The mapping including the intervening layers between the object and storage array may be referred to as a storage stack. FIG. 7 shows a block diagram of a storage stack 705 for a file system. This storage stack includes a top or first layer 710, a bottom layer 715, and intervening layers 720, 725, 730, and 735 between the top and bottom layers. The layers can represent various levels of abstraction from the storage array.

In the example show in FIG. 7, top layer 710 represents the object (e.g., "/filesystem 1"). Intervening layer 720 represents a volume in which the object is contained. Intervening layer 725 represents a volume group to which the volume belongs. Intervening layer 730 represents one or more disks associated with the volume. Intervening layer 735 represents a LUN associated with the one or more disks. Bottom layer 715 represents a storage array in which the one or more disks are located.

Referring back now to FIG. 1, in an embodiment, mapping metadata of an object, such as a file system, is stored. In a specific embodiment, the mapping indicates, for example, whether it is on a volume group and based on that a mapping is created. Based on this mapping, the backup application can rollback based on the snapshots that were involved. This allows for restoring to the same object (e.g., file system or an application object) because a clear mapping has been created that directs the rollback operation.

In a specific embodiment, the backup application (e.g., NetWorker Snapshot Management) performs a discovery operation during backup to understand the mapping of the object (save set) to be protected against the underlying LUN and to take the snapshot of that source LUN to the target LUN. For example, if the user/application requests a backup of a filesystem/filesystem1, the object profiler may conduct a discovery to obtain more granular details of the mapping of the object (e.g., "/filesystem1") to the storage array as shown in the storage stack example of FIG. 7. The profiler can discover the underlying LUNs that make up a file system.

The discovery mapping table provides a data structure within which to store the details of the storage stack including the mapping metadata or layout information. The mapping can be stored and maintained centrally at the backup management server or at another central database or repository accessible by the backup management server. Storing and maintaining the mapping centrally helps to reduce the amount of storage and processing workloads of the host clients. Should there be another request for a directed restore in the future, the system can perform an initial check to determine whether the mapping metadata or layout of the target object exists.

In a specific embodiment, the metadata identifies the target object (e.g., file system or database application) and the volume group, volume name, disks, LUNs, and storage array that are associated with the target object. Table A below shows an example of some of the metadata information that may be collected by the profiler.

TABLE A

| Object | Volume Group | Volume Name | Disks | LUN | Storage Array |
|---|---|---|---|---|---|
| /FS1 | VG1 | VVOL1 | DISK001 | LUN11 | APM-1122 |
|  |  |  | DISK002 | LUN12 |  |
| ./FS2 | VG2 | VVOL2 | DISK003 | LUN111 | APM-1111 |
|  |  |  |  | LUN121 |  |
| /FS3 | VG3 | VVOL3 | DISK004 | LUN222 | APM-2222 |
|  |  |  |  | LUN333 |  |
|  |  |  |  | LUN444 |  |

A first column of the table identifies the object. A second column identifies the associated volume group. A third column identifies the associated volumes. A volume may be referred to as a virtual volume (VVLOL). A fourth column identifies the associated disks. A fifth column identifies the associated LUNs. A sixth column identifies the associated storage array.

In a specific embodiment, during a directed restore, there may be change to the object name itself. Consider, as an example, that the rollback of /FS1 is directed to /FS4 which was not in backups of /FS1. In this specific embodiment, there is a discovery of objects that are called and not in the mapping and the mapping is created.

Consider, as an example, that the following request is received:

Rollback /FS1 to /FS4

In this example, the request is to rollback a first object (e.g., "/FS1") to a second object (e.g., "/FS4"), different from the first object. In a specific embodiment, a first check includes checking whether or not the mapping exists (see, e.g., table B below). More specifically, in an embodiment, a mapping index may be maintained. The mapping index may include a listing of the objects and a flag indicating whether or not there exists a mapping of the respective object.

TABLE B

| Object | In discovery map |
|---|---|
| /FS1 | Yes |
| /FS4 | No |

As shown in the example of table B above, there is a mapping for the first object (e.g., "/FS1") as the mapping may have been created during one or more of the various snapshot backups of the first object. However, no mapping exists for the second object (e.g., "/FS4") which has now been selected as a target for the rollback.

In a specific embodiment, after a request is received to rollback to a different object, the profiler checks whether a mapping of the object (or target object) exists. If the mapping does not exist, the profiler conducts a discovery operation to discover the new object. The profiler includes an algorithm to check the various levels of granularity down to identifying the physical device that is to be written to during the directed rollback operation.

In a specific embodiment, a discovery mapping may be performed for a file system. In another specific embodiment, the discovery mapping may be performed on an application. For example, there can be a request associated with an Oracle application for a directed restore to a standby database (with rollback). The mapping or translation can be handled similarly. For example, in a specific embodiment, a directed restore of a tablespace may include mapping it to the physical objects—file systems/raw devices and then mapping those devices to the underlying LUNs.

Below is an example of an algorithm for a traversing mechanism involving participation of the volume manager.

```
Object to Discover and Map (e.g., "/FS4")
   >>>Which volume is being used
      >>>Which volume groups are involved
         >>>What all Disks comprises of this volume
         >>>What all Disks and Volumes comprises
         this Volume Group
         >>>Map these Disks to the Storage Array ->
         LUN Mapping
```

Once the mapping of the target object has been discovered, a flag in the mapping index may be updated to indicate the presence or existence of the mapping (see, e.g., table C below) and the discovery mapping table may be updated with the mapping metadata (see, e.g., table D below).

TABLE C

| Object | In discovery map |
|---|---|
| /FS1 | Yes |
| /FS4 | Yes |

TABLE D

| Object | Volume Group | Volume Name | Disks | LUN | Storage Array |
|---|---|---|---|---|---|
| /FS1 | VG1 | VVOL1 | DISK001 DISK002 | LUN11 LUN12 | APM-1122 |
| ./FS2 | VG2 | VVOL2 | DISK003 | LUN111 LUN121 | APM-1111 |
| /FS3 | VG3 | VVOL3 | DISK004 | LUN222 LUN333 LUN444 | APM-2222 |
| /FS4 | VG4 | VVOL4 | DISK010 DISK011 | LUN101 LUN102 | APM-1122 |

As shown in the example of table D above, the discovery mapping table has been updated with a fourth entry. The fourth entry indicates that the object "/FS4" is associated with volume group "VG4," logical or virtual volume "VVOL4", disks "010" and "011," LUNs "101" and "102," and storage array "APM-1122."

In a specific embodiment, once the mapping has been established, the rollback process can be completed by calling the storage API to resynchronize/reverse synchronized the production LUN and the target LUN. The mapping of physical objects to the logical objects allows for mounting them back as required. These operations can be done in-line to the restore process or the discovery/profiling can be performed out of the actual restore process.

Figure 8:
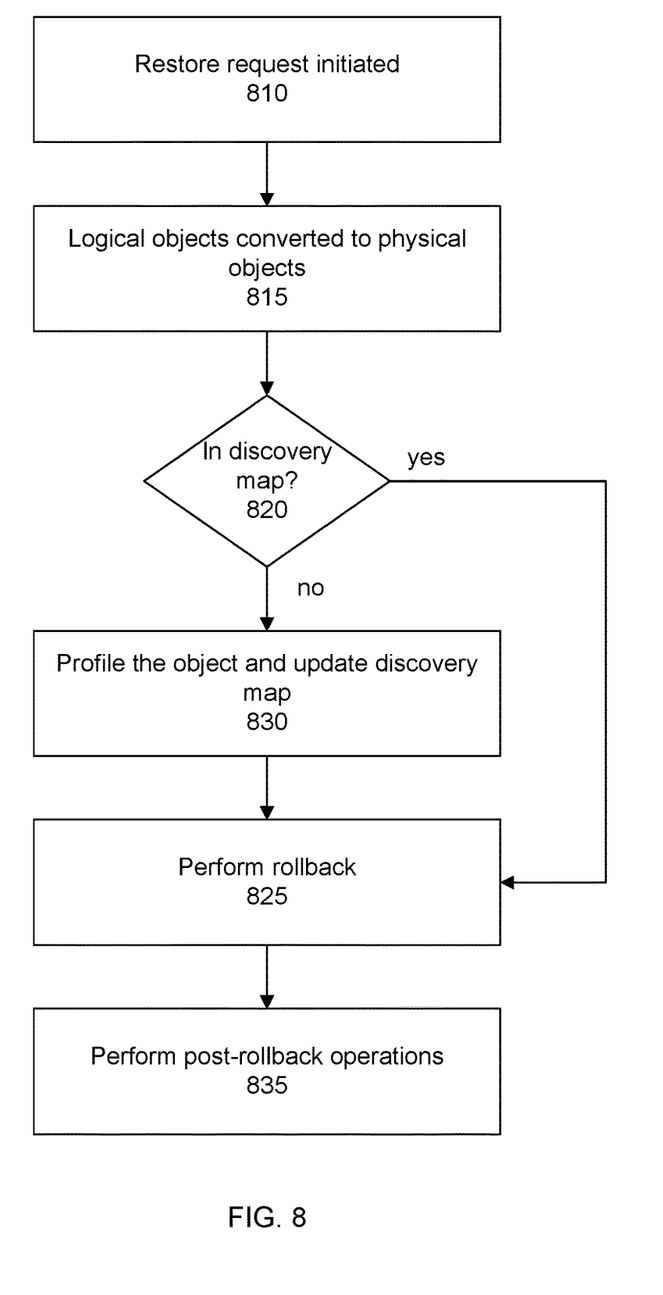
FIG. 8 shows a flow diagram for a directed rollback operation, under some embodiments.

FIG. 8 shows an overall flow or sequence diagram for a directed restore according to a specific embodiment. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other embodiments may not be exactly the same as the steps presented and may be modified or altered as appropriate for a particular process, application or based on the data.

In brief, in a step 810, a restore request is initiated. In a step 815, logical objects are converted to physical objects. In a step 820, a check is performed as to whether a logical object is in the discovery map. If the object has been mapped, a rollback is performed (step 825).

Alternatively, if the object has not been mapped, the profiler is called to profile the object and update the discovery map (step 830). The profiling process may include issuing from the profiler one or more commands or sequence of commands to the host of the first object, host of the second object, data storage system, volume manager, or combinations of these to discover the LUNs used or accessed by the second object, path information for the LUNs, components along the path, storage array and disk information associated with the LUNs, volume identifications, volume group identifications, operating system (OS) device, associated physical storage device and path, and the like.

Once the object has been mapped, the process can then move to performing the rollback (step 825). The rollback may include, for example, mounting the backup snapshot of the first object to a host of the second object and copying or synchronizing from the snapshot to a LUN or target LUN used by the second object. After the rollback has been completed, post-rollback operations may be performed (step 835). A post-rollback operation may include, for example, unmounting the backup snapshot from the host of the second object.

In a specific embodiment, the discovery mapping table may further record a timestamp indicating the time and date that a discovery of a particular object was performed. Depending upon the time and date that a discovery was last performed, a discovery may again be conducted to ensure that the mapping information recorded in the discovery mapping table is valid. In a specific embodiment, there can be a user-configurable threshold duration that indicates when the mapping information for a particular object (e.g., file system) recorded the mapping table expires.

For example, a user may set the threshold duration as being one day, two days, three days, four days, five days, one week, two weeks, three weeks, or any other duration of time. In this specific embodiment, the system, upon determining that mapping information for an object exists, calculates an amount of time between a current time and a time that the mapping information was obtained. The system compares the amount of time to the threshold duration. If the amount of time exceeds the threshold duration, the system determines that the mapping information has expired and another discovery operation may be performed by the profiler to ensure that no storage system changes have been made. If the amount of time is below the threshold duration, the system may continue to rely on the mapping information that is already present.

If, for example, the enterprise does not make frequent storage system configuration changes, the enterprise may set a long threshold duration to reduce the number of discovery operations performed. Alternatively, if the enterprise makes frequent storage system configuration changes, the enterprise may set a short threshold duration to ensure that the mapping information remains accurate.

Instead or additionally, the system may perform a test to verify that a LUN listed in the discovery mapping table as being used by an object is still accessible to the object. In this specific embodiment, the system, upon determining that mapping information for an object exists may use the mapping information to ping or perform a test I/O operation on the LUN identified in the mapping to ensure that the LUN is still available to the object. This helps to ensure that the following directed rollback operation to the target LUN will proceed smoothly and without errors. Before performing the directed rollback operation, the system may perform a check of the size of the target LUN to ensure that the target LUN has sufficient space for the directed rollback operation.

Figure 9:
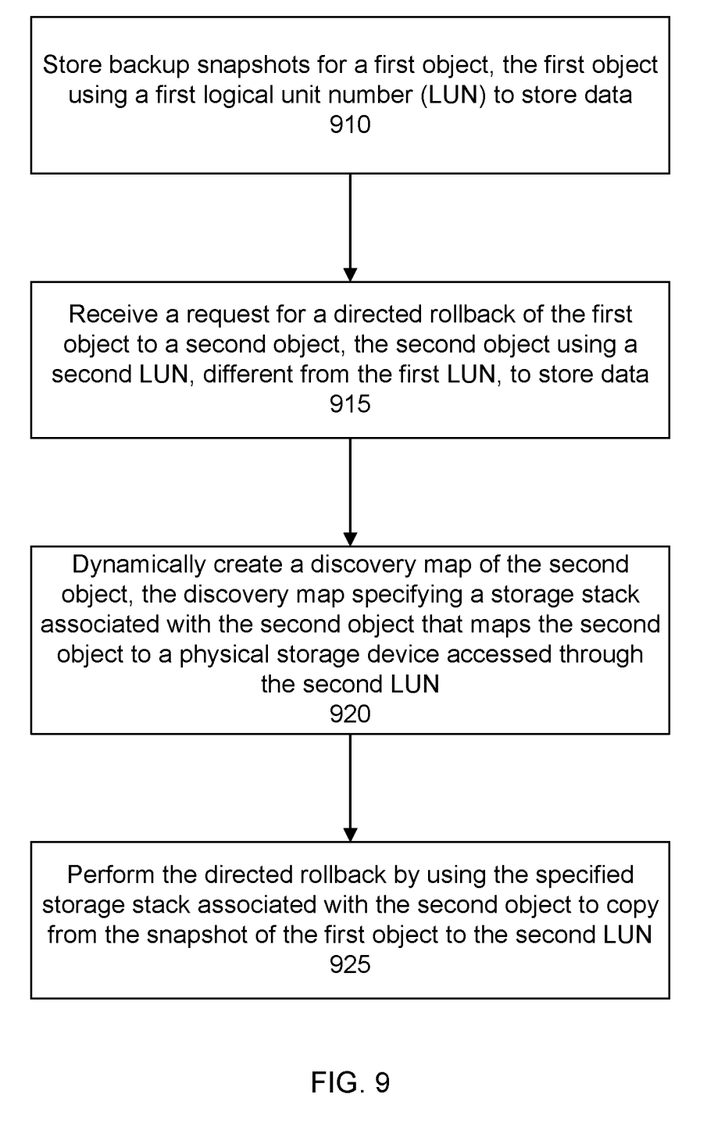
FIG. 9 shows another flow diagram for a directed rollback operation, under some embodiments.

FIG. 9 shows another flow for a directed restore according to a specific embodiment. In a step 910, backup snapshots are taken and stored for a first object where the first object uses or accesses a first LUN to store data. In a step 915, a request is received for a directed rollback of the first object to a second object where the second object uses or accesses a second LUN, different from the first LUN, to store data. The request may specify a particular snapshot of the first object that the user has selected, and an identification of the second object (or target) to which the snapshot should be rolled back to. The second object may be hosted by the same or different host from the first object. The first and second LUN may belong to the same or different volume groups or logical volumes. The first and second LUN may be provisioned on the same or different storage array.

In a step 920, a discovery map is dynamically created of the second object. In other words, in an embodiment, the discovery map of the second object is created after the request for a directed restore is received. The discovery map of the second object is created after backup snapshots of the first object have already been taken. The discovery map specifies a storage stack associated with the second object that maps the second object to a physical storage device accessed through the second LUN. Dynamically creating the discovery map helps to ensure that the collected mapping information is current and up-to-date as the information is collected in real-time or near real-time.

In a step 925, the directed rollback is performed using the specified storage stack associated with the second object to copy from the selected snapshot of the first object to the second LUN. In other words, the system selects the second LUN identified during the discovery as a target for the rollback.

The following is another example of a directed restore. In this case, the first object includes a database.
First object=/foo/object1/database_file_name (e.g., /foo/logicalvolume/oracle.dbf)

The first object stored contains "the stack" metadata which includes the filesystem→volume group name→logical volume name→OS device path→underlying array physical device(s).

In this specific embodiment, all that is required from the "second object" is the very first part of this "stack" which is the "filesystem" /foo as the target of the rollback. So, a user specifies they want the first object "/foo" (which has a storage stack from at the time of backup) restored to "/foo" where the target/foo may have a completely different stack (e.g., /foo/different_logicalvolume/different_volumegroup/different_OSdevicepath/different_physicaldevice(s)). In other words, the target of the directed rollback may be associated with a different volume group, different logical volume, and so forth. The system includes logic to automatically trace the target /foo to its corresponding physical device and identify the intervening virtualization layers or abstractions along the path between the target /foo and the physical device.

In a specific embodiment, the directed rollback can be performed with relatively little or no involvement of the application host of the first object or first LUN used by the first object. For example, the first LUN may be a production LUN. It is desirable to limit requests to the production LUN so that the LUN (and production host on which the LUN is mounted) can remain dedicated to servicing production requests, production I/Os, and so forth. Thus, the system provides for a central location (e.g., backup management server) through which the user can select the snapshot for the directed rollback, and select the target to which the snapshot should be rolled back to.

When the request for the directed rollback to the second object is received by the backup management server, a search or check for the discovery map or storage stack associated with the second object can be performed with little or no interruption to the operation of the production LUN and host because the mapping metadata is centrally stored. In an embodiment, the storage stack associated with the second object can be obtained by the profiler querying the volume manager for the relevant metadata mapping information. The backup management server may then direct and coordinate the directed rollback operation. For example, the backup management server may instruct a host of the second object to mount the particular snapshot of the first object (e.g., mount snapshot of LUN used by the first object). The backup management server may then instruct the host of the second object to synchronize the LUN used by the second object to the snapshot of the LUN.

After the directed rollback operation has completed, a state of the target LUN may be at a past point-in-time corresponding to the selected backup snapshot of the production LUN. A state of the production LUN may be at a current point-in-time. Previous data stored on the target LUN may be overwritten based on the data from the selected backup snapshot of the production LUN while data on the production LUN may be current and not overwritten.

Referring back now to FIG. 1, the host clients and servers can be general purpose computers with including hardware and software components, applications, a processor, memory, storage, network interface, input device, display (e.g., electronic display or screen), and so forth. In a distributed network environment, the network may represent a cloud-based network environment in which applications, servers and data are maintained and provided through a centralized cloud computing platform. In an embodiment, system 100 may represent a multi-tenant network in which a server computer runs a single instance of a program serving multiple clients (tenants) in which the program is designed to virtually partition its data so that each client works with its own customized virtual application, with each virtual machine (VM) representing virtual clients that may be supported by one or more servers within each VM, or other type of centralized network server.

The data generated within system 100 may be stored in any number of persistent storage locations and devices, such as local client storage, server storage, or network storage, which may at least be partially implemented through storage device arrays, such as RAID components. In an embodiment network 105 may be implemented to provide support for various storage architectures such as storage area network (SAN), Network-attached Storage (NAS), or Direct-attached Storage (DAS) that make use of large-scale network accessible storage devices, such as large capacity tape or drive (optical or magnetic) arrays. In an embodiment, the target storage devices, such as tape or disk array may represent any practical storage device or set of devices, such as tape libraries, virtual tape libraries (VTL), fiber-channel (FC) storage area network devices, and OST (OpenStorage) devices. In a specific embodiment, however, the target storage devices represent disk-based targets implemented through virtual machine technology.

System 100 may utilize certain protocol-specific namespaces that are the external interface to applications and include NFS (network file system) and CIFS (common internet file system) namespaces, as well as a virtual tape library (VTL) or DD Boost provided by Dell EMC Corporation. In general, DD Boost (Data Domain Boost) is a system that distributes parts of the deduplication process to the backup server or application clients, enabling client-side deduplication for faster, more efficient backup and recovery. A data storage deployment may use any combination of these interfaces simultaneously to store and access data. Data Domain (DD) devices in system 100 may use the DD Boost backup protocol to provide access from servers to DD devices. The DD Boost library exposes APIs (application programming interfaces) to integrate with a Data Domain system using an optimized transport mechanism. These API interfaces exported by the DD Boost Library provide mechanisms to access or manipulate the functionality of a Data Domain file system, and DD devices generally support both NFS and CIFS protocol for accessing files. DD Boost is a high-speed client-side data de-duplication system.

Figure 10:
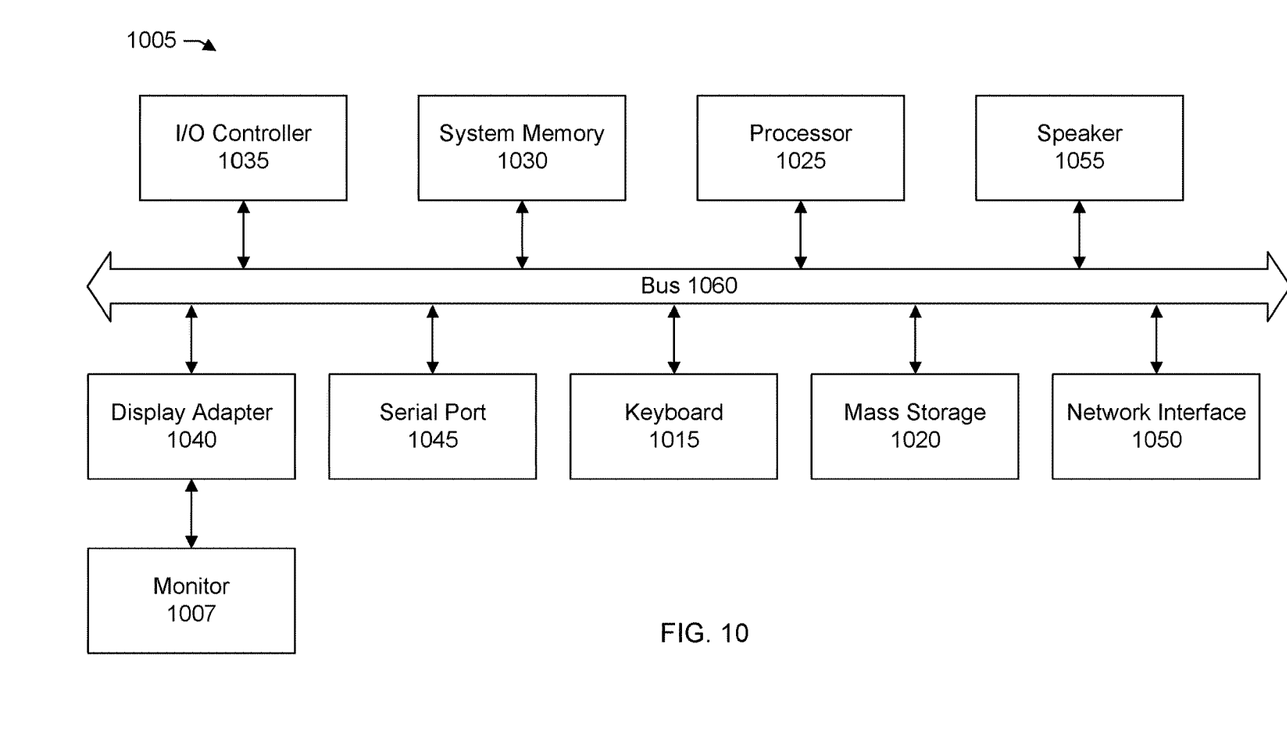
FIG. 10 shows a block diagram of a computer system suitable for use with the system, under some embodiments.

FIG. 10 shows a system block diagram of a computer system 1005 used to execute the software of the present system described herein. The computer system includes a monitor 1007, keyboard 1015, and mass storage devices 1020. Computer system 1005 further includes subsystems such as central processor 1025, system memory 1030, input/output (I/O) controller 1035, display adapter 1040, serial or universal serial bus (USB) port 1045, network interface 1050, and speaker 1055. The system may also be used with computer systems with additional or fewer subsystems. For example, a computer system could include more than one processor 1025 (i.e., a multiprocessor system) or a system may include a cache memory.

Arrows such as 1060 represent the system bus architecture of computer system 1005. However, these arrows are illustrative of any interconnection scheme serving to link the subsystems. For example, speaker 1055 could be connected to the other subsystems through a port or have an internal direct connection to central processor 1025. The processor may include multiple processors or a multicore processor, which may permit parallel processing of information. Computer system 1005 shown in FIG. 10 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system may be one of the Microsoft Windows®. family of systems (e.g., Windows Server), Linux, Mac OS X, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless. For example, signals from a computer may be transferred, at least in part, wirelessly to components or other computers.

In a specific embodiment, a method includes storing a plurality of snapshots for a first object, the first object using a first logical unit number (LUN) to store data, and the snapshots corresponding to points-in-time that the first object may be rolled back to; receiving a request for a directed rollback of the first object to a second object, the request specifying a particular snapshot of the plurality of snapshots, and the second object using a second LUN, different from the first LUN, to store data; after the receiving a directed rollback request, dynamically creating a discovery map of the second object, the discovery map specifying a storage stack associated with the second object that maps the second object to a physical storage device accessed through the second LUN; and performing the directed rollback to a point-in-time corresponding to the particular snapshot, the performing comprising obtaining, from the discovery map, the storage stack associated with the second object that maps the second object to the physical storage device.

The first object may include a first file system. The second object may include a second file system. The first object may include a first database. The second object may include a second database.

Dynamically creating a discovery map of the second object may include: communicating with a volume manager that manages one or more storage arrays in which the first and second LUNs have been provisioned; and obtaining, in response to the communicating, identifications of a volume, volume group, operating system (OS) device path, and physical storage device within the one or more storage arrays, wherein each of the volume, volume group, OS device path, and physical storage device of the one or more storage arrays are associated with the second object, and wherein the first object is associated with a different volume, volume group, OS device path, and physical storage device within the one or more storage arrays.

Performing the directed rollback may include: instructing a host of the second object to mount the particular snapshot; and instructing the host to synchronize the second LUN used by the second object to the particular snapshot. The method may include storing the discovery map at a central server.

In another specific embodiment, there is a system comprising: a processor-based system executed on a computer system comprising a processor, wherein the processor is configured to: store a plurality of snapshots for a first object, the first object using a first logical unit number (LUN) to store data, and the snapshots corresponding to points-in-time that the first object may be rolled back to; receive a request for a directed rollback of the first object to a second object, the request specifying a particular snapshot of the plurality of snapshots, and the second object using a second LUN, different from the first LUN, to store data; after the receipt of a directed rollback request, dynamically create a discovery map of the second object, the discovery map specifying a storage stack associated with the second object that maps the second object to a physical storage device accessed through the second LUN; and perform the directed rollback to a point-in-time corresponding to the particular snapshot, the performing comprising obtaining, from the discovery map, the storage stack associated with the second object that maps the second object to the physical storage device.

In another specific embodiment, there is a computer program product, comprising a non-transitory computer-readable medium having a computer-readable program code embodied therein, the computer-readable program code adapted to be executed by one or more processors to implement a method comprising: storing a plurality of snapshots for a first object, the first object using a first logical unit number (LUN) to store data, and the snapshots corresponding to points-in-time that the first object may be rolled back to; receiving a request for a directed rollback of the first object to a second object, the request specifying a particular snapshot of the plurality of snapshots, and the second object using a second LUN, different from the first LUN, to store data; after the receiving a directed rollback request, dynamically creating a discovery map of the second object, the discovery map specifying a storage stack associated with the second object that maps the second object to a physical storage device accessed through the second LUN; and performing the directed rollback to a point-in-time corresponding to the particular snapshot, the performing comprising obtaining, from the discovery map, the storage stack associated with the second object that maps the second object to the physical storage device.

In another specific embodiment, a method includes storing snapshots and a first discovery map of a first object, the snapshots corresponding to points-in-time that the first object may be rolled back to, and the first discovery map comprising first metadata mapping the first object to a first logical unit number (LUN) accessed by the first object; receiving a request to rollback the first object to a second object, different from the first object, using a snapshot of the first object; checking whether a discovery map of the second object that maps the second object to a LUN accessed by the second object exists; determining that the discovery map of the second object does not exist; upon the determining, generating the discovery map of the second object, the discovery map being a second discovery map and comprising second metadata mapping the second object to a second LUN accessed by the second object; and performing, in response to the request, a rollback operation of the first object to the second object using the snapshot of the first object and the second discovery map.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment. Other embodiments include systems and non-volatile media products that execute, embody or store processes that implement the methods described above.

What is claimed is:

1. A method comprising:
    storing a plurality of snapshots for a first object, the first object using a first logical unit number (LUN) to store data, and the snapshots corresponding to points-in-time that the first object is allowed to be rolled back to;
    receiving a request for a directed rollback of the first object to a second object, the request specifying a particular snapshot of the plurality of snapshots, and the second object using a second LUN, different from the first LUN, to store data;
    after the receiving a directed rollback request, dynamically creating a discovery map of the second object, the discovery map specifying a storage stack associated with the second object that maps the second object to a physical storage device accessed through the second LUN; and
    performing the directed rollback to a point-in-time corresponding to the particular snapshot, the performing comprising obtaining, from the discovery map, the storage stack associated with the second object that maps the second object to the physical storage device.

2. The method of claim 1 wherein the first object comprises a first file system, and the second object comprises a second file system.

3. The method of claim 1 wherein the first object comprises a first database, and the second object comprises a second database.

4. The method of claim 1 wherein the dynamically creating a discovery map of the second object comprises:
    communicating with a volume manager that manages one or more storage arrays in which the first and second LUNs have been provisioned; and
    obtaining, in response to the communicating, identifications of a volume, volume group, operating system (OS) device path, and physical storage device within the one or more storage arrays,
    wherein each of the volume, volume group, OS device path, and physical storage device of the one or more storage arrays are associated with the second object, and
    wherein the first object is associated with a different volume, volume group, OS device path, and physical storage device within the one or more storage arrays.

5. The method of claim 1 wherein the performing the directed rollback comprises:
    instructing a host of the second object to mount the particular snapshot; and instructing the host to synchronize the second LUN used by the second object to the particular snapshot.

6. The method of claim 1 comprising storing the discovery map at a central server.

7. A system comprising:
a processor-based system executed on a computer system comprising a processor, wherein the processor is configured to:
store a plurality of snapshots for a first object, the first object using a first logical unit number (LUN) to store data, and the snapshots corresponding to points-in-time that the first object is allowed to be rolled back to;
receive a request for a directed rollback of the first object to a second object, the request specifying a particular snapshot of the plurality of snapshots, and the second object using a second LUN, different from the first LUN, to store data;
after the receipt of a directed rollback request, dynamically create a discovery map of the second object, the discovery map specifying a storage stack associated with the second object that maps the second object to a physical storage device accessed through the second LUN; and
perform the directed rollback to a point-in-time corresponding to the particular snapshot, the performing comprising obtaining, from the discovery map, the storage stack associated with the second object that maps the second object to the physical storage device.

8. The system of claim 7 wherein the first object comprises a first file system, and the second object comprises a second file system.

9. The system of claim 7 wherein the first object comprises a first database, and the second object comprises a second database.

10. The system of claim 7 wherein the processor is configured to:
communicate with a volume manager that manages one or more storage arrays in which the first and second LUNs have been provisioned; and
obtain, in response to the communicating, identifications of a volume, volume group, operating system (OS) device path, and physical storage device within the one or more storage arrays,
wherein each of the volume, volume group, OS device path, and physical storage device of the one or more storage arrays are associated with the second object, and
wherein the first object is associated with a different volume, volume group, OS device path, and physical storage device within the one or more storage arrays.

11. The system of claim 7 wherein the processor is configured to:
instruct a host of the second object to mount the particular snapshot; and
instruct the host to synchronize the second LUN used by the second object to the particular snapshot.

12. The system of claim 7 wherein the processor is configured to store the discovery map at a central server.

13. A computer program product, comprising a non-transitory computer-readable medium having a computer-readable program code embodied therein, the computer-readable program code adapted to be executed by one or more processors to implement a method comprising:
storing a plurality of snapshots for a first object, the first object using a first logical unit number (LUN) to store data, and the snapshots corresponding to points-in-time that the first object is allowed to be rolled back to;
receiving a request for a directed rollback of the first object to a second object, the request specifying a particular snapshot of the plurality of snapshots, and the second object using a second LUN, different from the first LUN, to store data;
after the receiving a directed rollback request, dynamically creating a discovery map of the second object, the discovery map specifying a storage stack associated with the second object that maps the second object to a physical storage device accessed through the second LUN; and
performing the directed rollback to a point-in-time corresponding to the particular snapshot, the performing comprising obtaining, from the discovery map, the storage stack associated with the second object that maps the second object to the physical storage device.

14. The computer program product of claim 13 wherein the first object comprises a first file system, and the second object comprises a second file system.

15. The computer program product of claim 13 wherein the first object comprises a first database, and the second object comprises a second database.

16. The computer program product of claim 13 wherein the dynamically creating a discovery map of the second object comprises:
communicating with a volume manager that manages one or more storage arrays in which the first and second LUNs have been provisioned; and
obtaining, in response to the communicating, identifications of a volume, volume group, operating system (OS) device path, and physical storage device within the one or more storage arrays,
wherein each of the volume, volume group, OS device path, and physical storage device of the one or more storage arrays are associated with the second object, and
wherein the first object is associated with a different volume, volume group, OS device path, and physical storage device within the one or more storage arrays.

17. The computer program product of claim 13 wherein the performing the directed rollback comprises:
instructing a host of the second object to mount the particular snapshot; and
instructing the host to synchronize the second LUN used by the second object to the particular snapshot.

18. The computer program product of claim 13 wherein the method comprises storing the discovery map at a central server.

* * * * *